US006820307B2

(12) United States Patent
Lu

(10) Patent No.: US 6,820,307 B2
(45) Date of Patent: Nov. 23, 2004

(54) ELASTIC HINGE FOR A NOTEBOOK COMPUTER

(75) Inventor: Sheng-Nan Lu, Taipei Hsien (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 104 days.

(21) Appl. No.: 10/245,356

(22) Filed: Sep. 17, 2002

(65) Prior Publication Data
US 2004/0049885 A1 Mar. 18, 2004

(51) Int. Cl.[7] ............................................. E05C 17/64
(52) U.S. Cl. ............................. 16/342; 16/341; 16/386
(58) Field of Search ................... 16/319, 337, 341–342, 16/380, 386

(56) References Cited

U.S. PATENT DOCUMENTS

| 737,360 | A | * | 8/1903 | Daly | 16/381 |
|---|---|---|---|---|---|
| 2,619,673 | A | * | 12/1952 | Evans | 16/341 |
| 3,594,073 | A | * | 7/1971 | Liautaud | 16/228 |
| 4,227,283 | A | * | 10/1980 | Mathewson et al. | 16/273 |
| 4,584,739 | A | * | 4/1986 | Konen | 16/266 |
| 5,040,268 | A | * | 8/1991 | Knurr | 16/261 |
| 5,765,263 | A | * | 6/1998 | Bolinas et al. | 16/342 |
| 5,887,317 | A | * | 3/1999 | Baker | 16/329 |
| 5,915,440 | A | * | 6/1999 | Repo | 16/330 |
| 6,085,388 | A | * | 7/2000 | Kaneko | 16/338 |
| 6,170,120 | B1 | * | 1/2001 | Lu | 16/342 |
| 6,230,365 | B1 | * | 5/2001 | Lu | 16/342 |
| 6,317,928 | B1 | * | 11/2001 | Guillemette | 16/353 |
| 6,513,197 | B2 | * | 2/2003 | Rude et al. | 16/342 |
| 6,671,929 | B1 | * | 1/2004 | Lu | 16/342 |

* cited by examiner

Primary Examiner—Daniel P. Stodola
Assistant Examiner—Christopher Boswell
(74) Attorney, Agent, or Firm—William E. Pelton, Esq.

(57) ABSTRACT

A hinge for a notebook computer is composed of a pintle and two barrels. The first barrel is provided outside the first part of the pintle, and the second barrel is provided outside the second part of the pintle. At least one arcuate protrusion is formed on the pintle. The first barrel has a lug formed at an end facing the arcuate protrusion and abutting the arcuate protrusion. When the computer is closed, the first barrel is compressed to provide an elastic force to open the monitor.

4 Claims, 7 Drawing Sheets

ELASTIC HINGE FOR A NOTEBOOK COMPUTER

BACKGROUND OF THE INVENTION

1. Field of the Invention

The present invention is related to an elastic hinge for a notebook computer, and more particularly to a hinge which has an elastic force to automatically raise a monitor of the notebook computer.

2. Description of Related Art

A notebook computer comprises a body and a monitor pivotally mounted on the body by hinges. When the computer is closed, the monitor abuts the body and is fastened by a locking member.

However, the conventional hinge does not provide an elastic force to slightly raise the monitor when a user wants to open the computer.

Therefore, the invention provides a hinge for a notebook computer to mitigate and/or obviate the aforementioned problems.

SUMMARY OF THE INVENTION

The main objective of the invention is to provide a hinge for a notebook computer which can provide an elastic force to slightly raise a monitor when a locking member of the computer is released.

Other objects, advantages and novel features of the invention will become more apparent from the following detailed description when taken in conjunction with the accompanying drawings.

DETAILED DESCRIPTION OF THE PREFERRED EMBODIMENT

Figure 1:
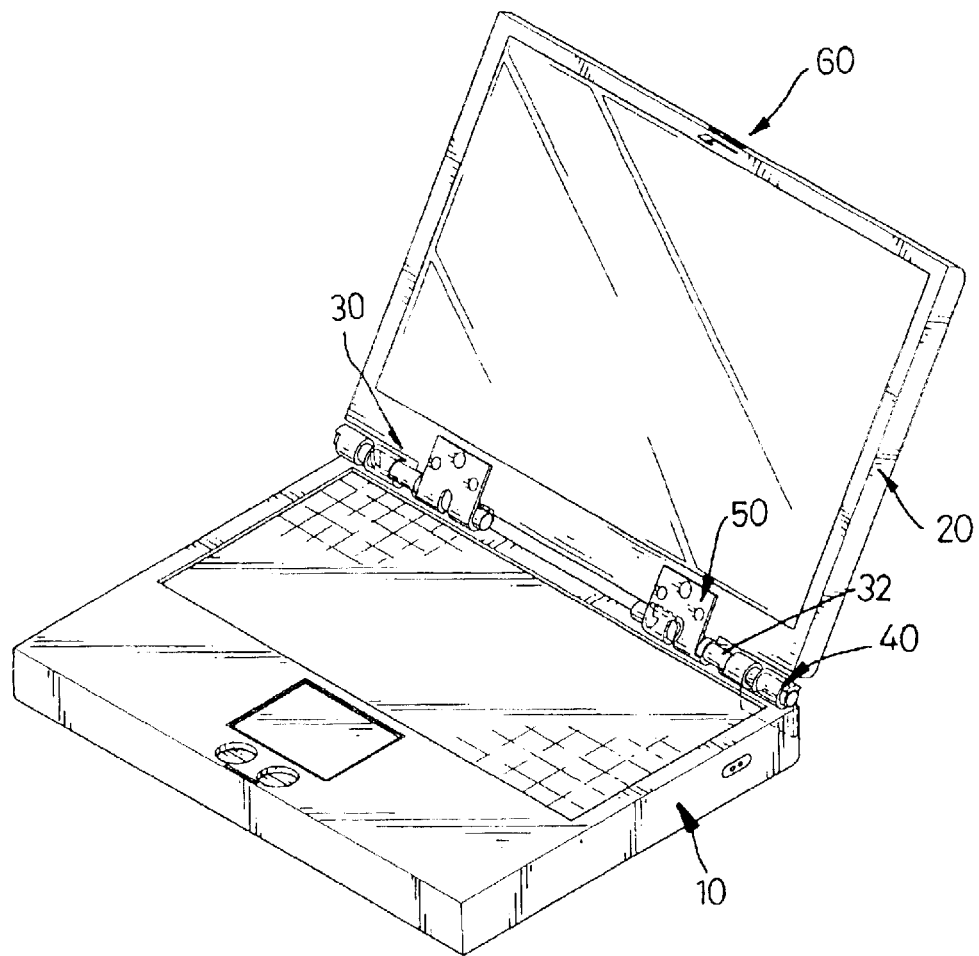
FIG. 1 is a perspective view of a notebook assembled with hinges in accordance with the invention.
Figure 2:
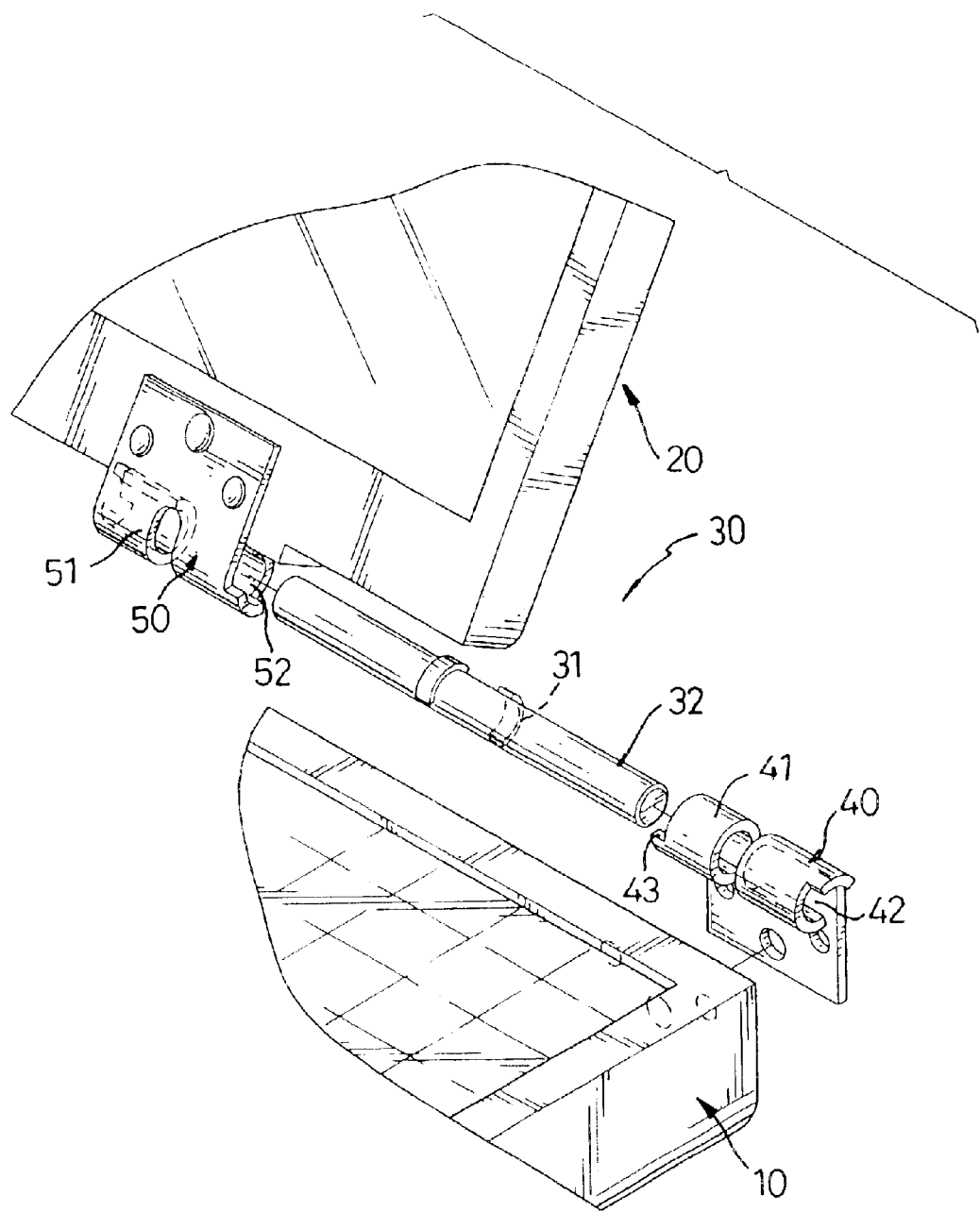
FIG. 2 is an exploded perspective view of the hinge in FIG. 1.
Figure 3:
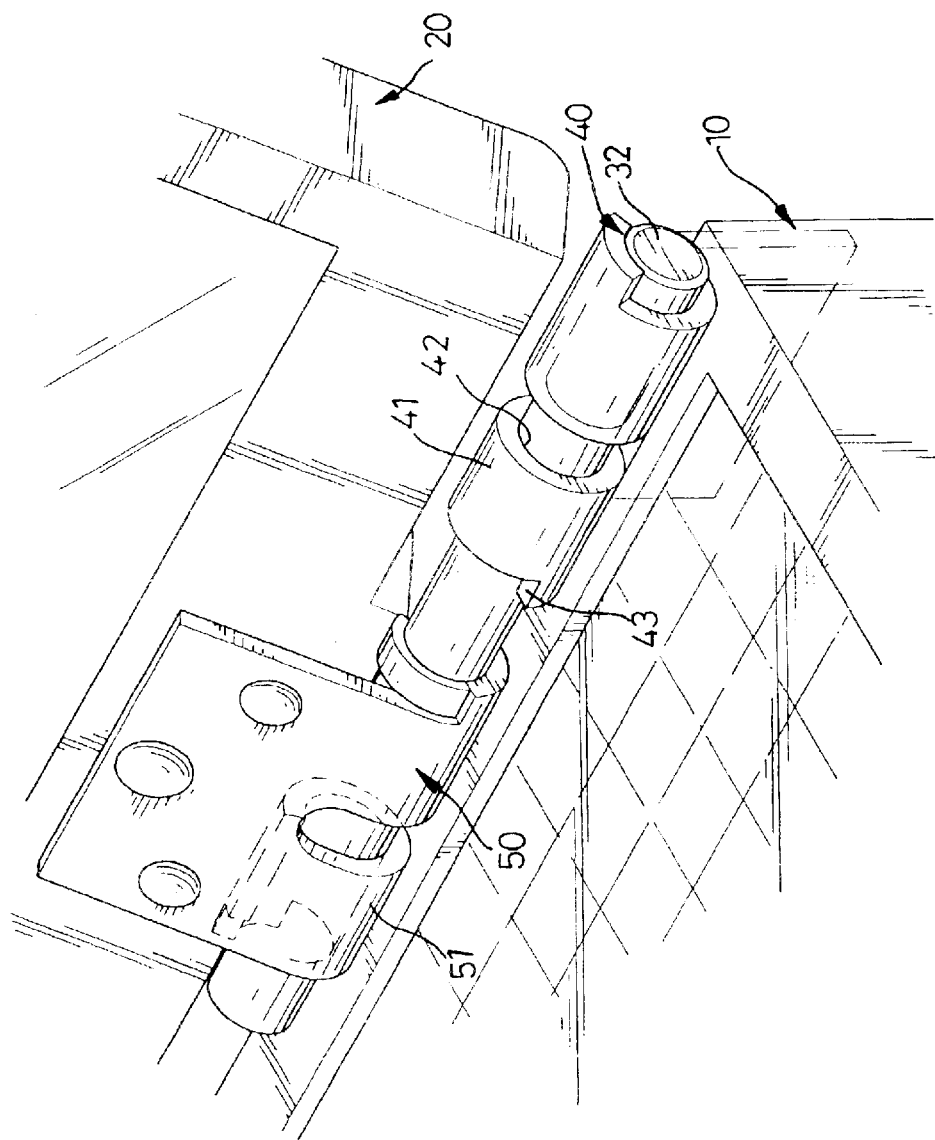
FIG. 3 is a perspective view of the hinge in FIG. 1.

Referring to FIGS. 1-3, a notebook computer is composed of a body (10) and a monitor (20) pivotally mounted on the body (10) by two hinges. The monitor (20) has a locking member (60) to fasten the monitor (20) on the body (10) when the computer is closed.

The elastic hinge in accordance with the invention is composed of a pintle (30), a first barrel (40), and a second barrel (50). The first barrel (40) is mounted on the body (10), and the second barrel (50) is mounted on the monitor (20).

The pintle (30) has a first part, a second part and a middle part between the first part and the second part. At least one arcuate protrusion (31) is formed on the middle part.

The first barrel (40) is rotatably provided outside the first part of the pintle (10), and has two first C-like tubular portions (41) aligned with each other, and each portion (41) has a first passage (42). The first C-like tubular portion (41) adjacent the arcuate protrusion (31) has a lug (43) formed at an end facing the respective arcuate protrusion (31) and abutting the protrusion (31). The first barrel (40) further has a first plate extending therefrom and fastened on the body (10).

The second barrel (50) is securely provided outside the second part of the pintle (10), and has two second C-like tubular portions (51) aligned with each other, and each second portion (51) has a second passage (52). The second barrel (50) further has a second plate extending therefrom and fastened on the monitor (20).

Figure 4:
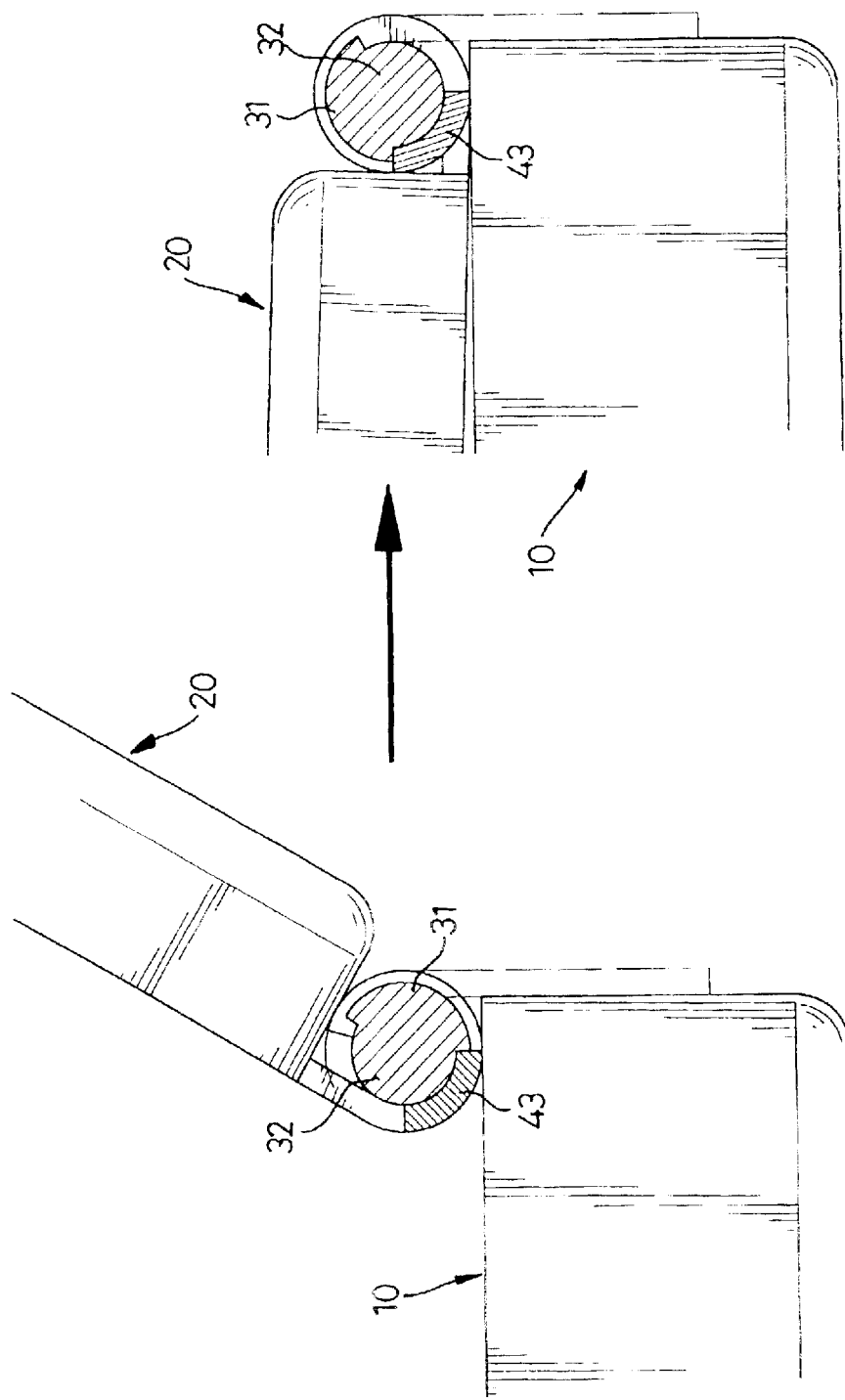
FIG. 4 is a side view showing the hinge from an open status to a closed status.
Figure 5:
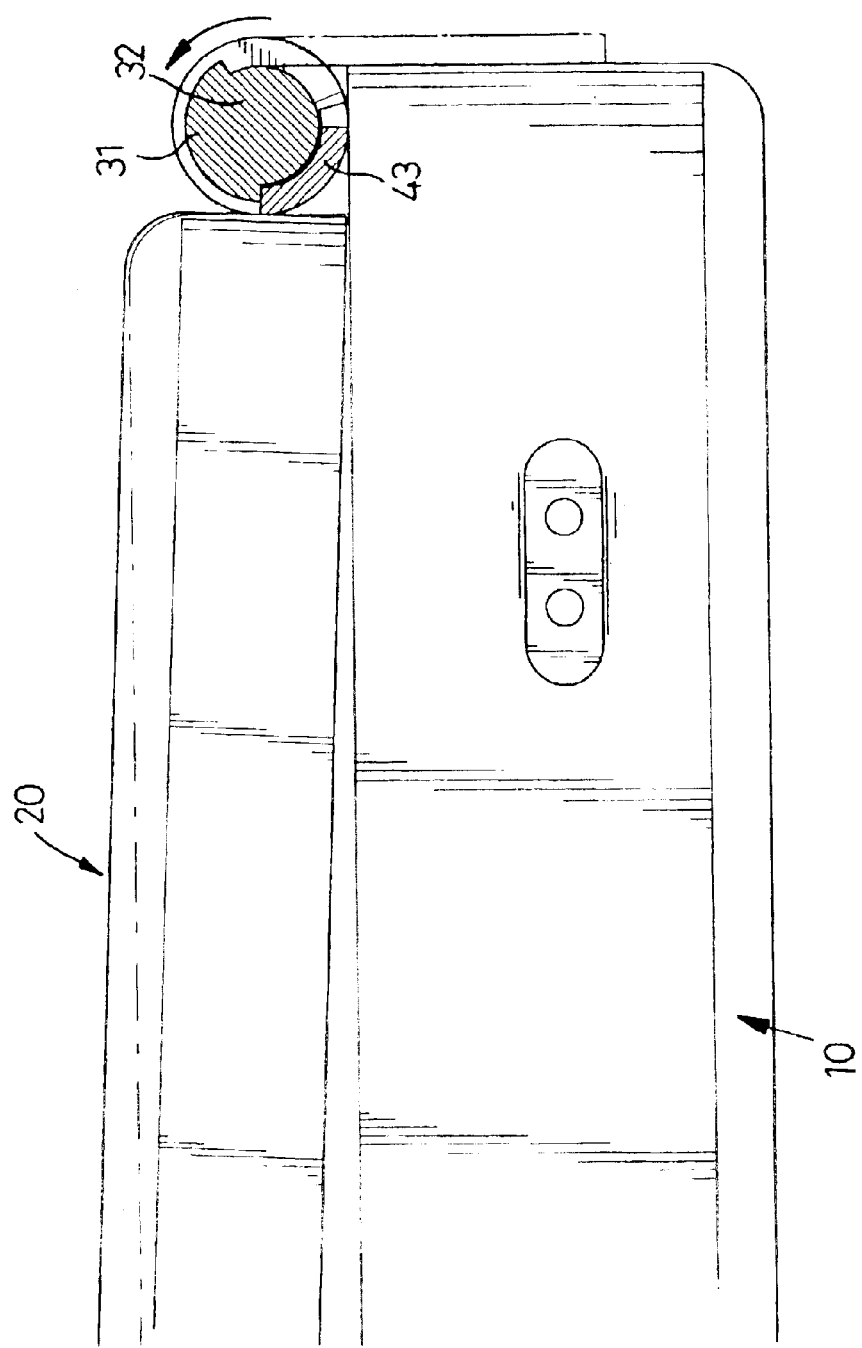
FIG. 5 is a side view of the hinge in the closed status.

Referring to FIGS. 4-5, when the monitor (20) is raised, a first side of the lug (43) abuts a first side of the arcuate protrusion (31), and the monitor (20) is positioned. When the monitor (20) is pivoted down to abut the body (10), a second side of the lug (43) abuts a second side of the arcuate protrusion (31). In this mode, the monitor (20) does not completely abut the body (10), and there is a gap between the monitor (20) and the body (10). A user must press the monitor (20) down to attach the locking member (60) to the body (10) to close the computer, so that the arcuate protrusion (31) presses against the lug (43) to compress the first barrel (40).

Figure 6:
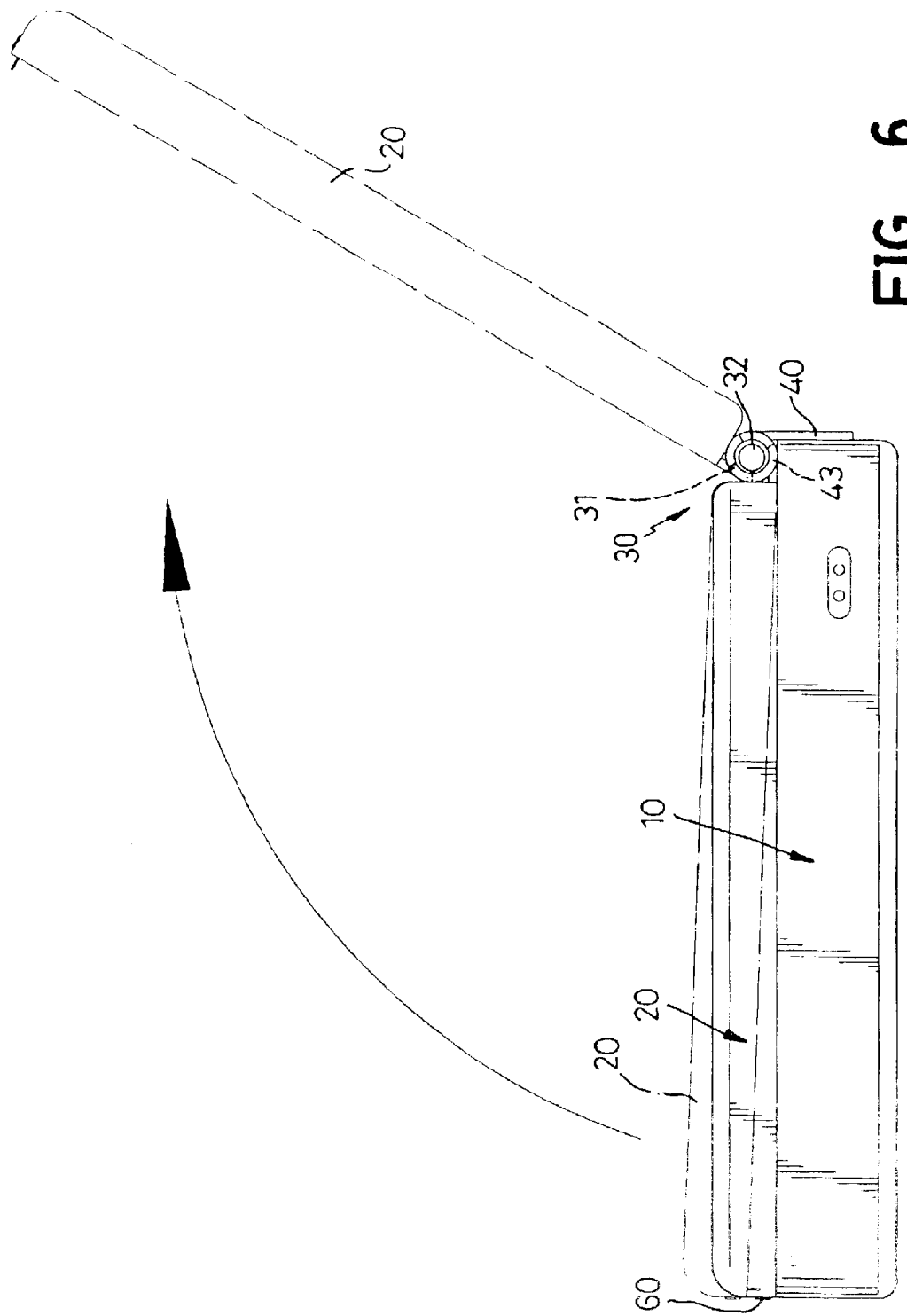
FIG. 6 is a side view showing the monitor automatically raised.

Referring to FIG. 6, when the user releases the locking member (60) to open the computer, the elastic force of the compressed first barrel (40) can slightly push the monitor (20) to pivot upwards, so that the user can easily and conveniently raise the monitor (20).

According to another embodiment of the present invention, the first barrel (40) is securely provided outside the pintle (30), and the second barrel (50) is rotatably provided outside the pintle (30). The second barrel (50) has the lug abutting the arcuate protrusion (31). According to a further embodiment of the present invention, two arcuate protrusions (31) are separately formed at diametrically opposite sides of the pintle (30). The first barrel (40) and the second barrel (50) each have a lug abutting the corresponding arcuate protrusion (31).

The two configurations mentioned above have the same function and effect, and will not depart from the scope of the invention.

Figure 7:
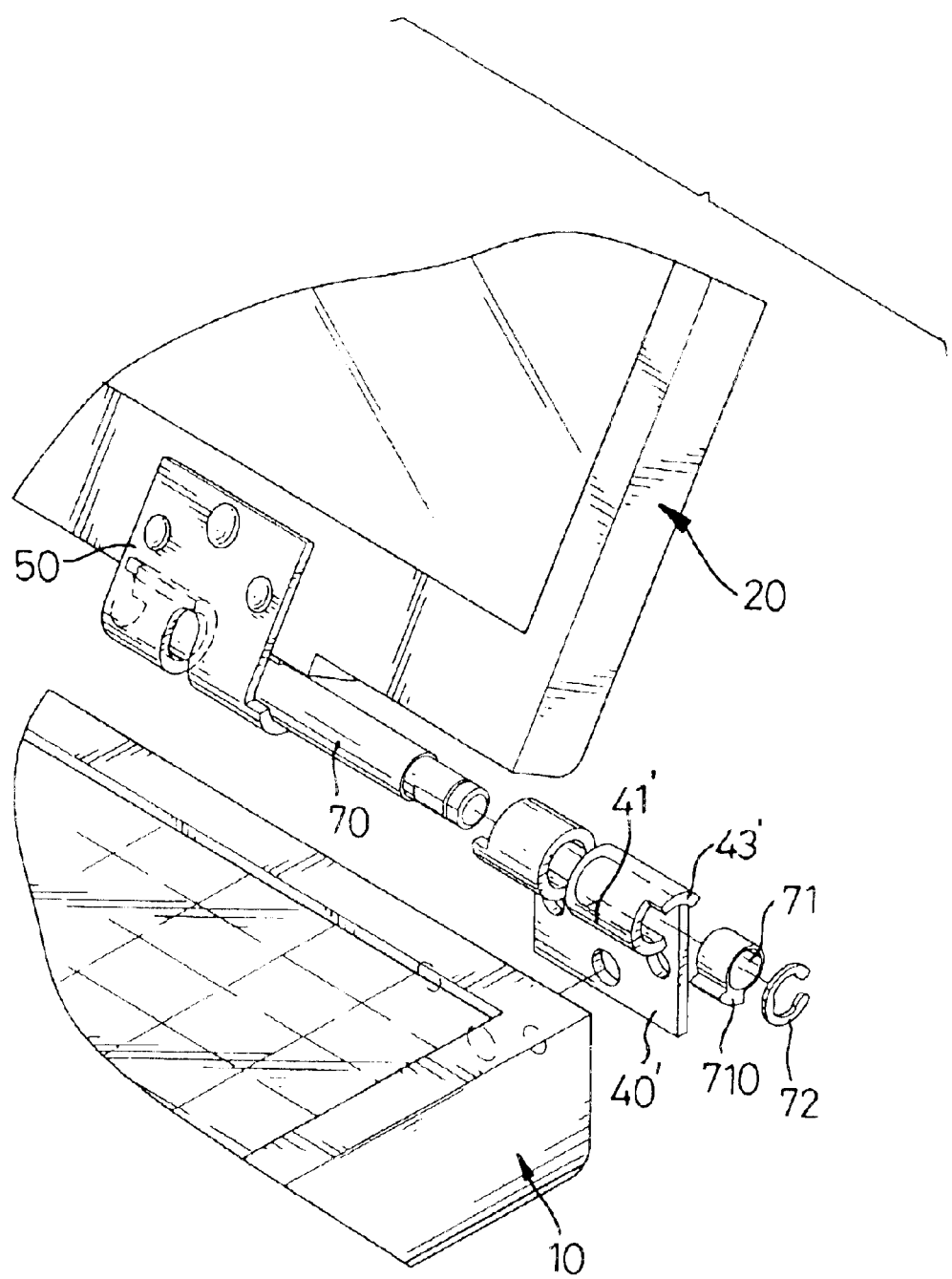
FIG. 7 is an exploded perspective view of another embodiment of the hinge in accordance with the invention.

With reference to FIG. 7, in another embodiment of the invention, the first barrel (40') is rotatably mounted on the first part of the pintle (70), and the second barrel (50) is securely mounted on the second part of the pintle (70). A sleeve (71) is securely provided outside an end of the pintle (70) adjacent the first barrel (40'), and has an arcuate ridge (710) longitudinally formed at an outer periphery of the sleeve (71). The first barrel (40') has a lug (43') formed at an end facing the sleeve (71) and abutting the arcuate ridge (710).

The pintle (70) further has a round slot (not numbered) defined at the end thereof, and a collar (72) is attached in the round slot to prevent the sleeve (71) from escaping.

When the monitor (20) abuts the body (10), the ridge (710) presses against the lug (43') to compress the first barrel (40'). The elastic force of the compressed first barrel (40) can slightly push the monitor (20) to pivot upwards when the locking member (60) is released.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An elastic hinge for a notebook computer, the hinge comprising:

a pintle with a first part, a second part, and a middle part between the first part and the second part, the pintle having at least one arcuate protrusion homogenously formed at the middle part;

a first barrel provided outside the first part of the pintle, the first barrel having two first C-like tubular portions aligned with each other, and a first lug formed at an outside end of the first C-like tubular portions facing the at least one arcuate protrusion and abutting at least one arcuate protrusion; and a second barrel provided outside the second part of the pintle, the second barrel having two second C-like tubular portions aligned with each other.

2. The hinge as claimed in claim 1, wherein the pintle has two arcuate protrusions separately formed at two diametrically opposite sides thereof; the first lug of the first barrel abutting the arcuate protrusion adjacent the first barrel; the second barrel having a second lug formed on an end of the second C-like tubular portions facing the arcuate protrusion and abutting the arcuate protrusion adjacent the second barrel.

3. An elastic hinge for a notebook computer, the hinge comprising:

a pintle with a first part, a second part, and a first end adjacent the first part;

a first barrel provided outside the first part of the pintle, the first barrel having two first C-like tubular portions aligned with each other, and a lug formed at an end of the first C-like tubular portions facing the first end of the pintle;

a second barrel provided outside the second part of the pintle, the second barrel having two second C-like tubular portions aligned with each other; and a sleeve provided outside the first end of the pintle, the sleeve having an homogenously arcuate ridge longitudinally formed on an outer periphery of the sleeve, and abutting the lug of the first barrel.

4. The hinge as claimed in claim 3, wherein the pintle has a round slot circumferentially defined at the first end thereof, a collar being attached in the round slot to secure the sleeve.

* * * * *